US012668244B2

(12) United States Patent
Groetzki et al.

(10) Patent No.: US 12,668,244 B2
(45) Date of Patent: Jun. 30, 2026

(54) SYSTEM AND METHOD FOR OPERATING A VEHICLE FUNCTION

(71) Applicant: Bayerische Motoren Werke Aktiengesellschaft, Munich (DE)

(72) Inventors: Sascha Groetzki, Augsburg (DE); Fabian Herbst, Munich (DE); Lucien Stemmelen, Vierkirchen (DE); Regina Wielsch, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 34 days.

(21) Appl. No.: 18/993,645

(22) PCT Filed: Aug. 9, 2023

(86) PCT No.: PCT/EP2023/072093
§ 371 (c)(1),
(2) Date: Jan. 13, 2025

(87) PCT Pub. No.: WO2024/037951
PCT Pub. Date: Feb. 22, 2024

(65) Prior Publication Data
US 2026/0008463 A1    Jan. 8, 2026

(30) Foreign Application Priority Data
Aug. 17, 2022    (DE) ..................... 10 2022 120 821.4

(51) Int. Cl.
*B60W 30/18* (2012.01)
*B60H 1/00* (2006.01)

(52) U.S. Cl.
CPC ... *B60W 30/18009* (2013.01); *B60H 1/00735* (2013.01); *B60H 1/0075* (2013.01);
(Continued)

(58) Field of Classification Search
CPC .............. B60H 1/00735; B60H 1/0075; B60H 1/00785; B60K 28/00–165;
(Continued)

(56) References Cited

U.S. PATENT DOCUMENTS

2014/0042965 A1    2/2014    Haug
2019/0257231 A1    8/2019    Dudar

FOREIGN PATENT DOCUMENTS

CN          113464017 A  *  10/2021    ............ B60S 1/0833
DE    102008047702 A1  *  3/2010    ............ G07C 5/085
(Continued)

OTHER PUBLICATIONS

Bald, De 10 2008 047 702, machine translation. (Year: 2010).*
(Continued)

*Primary Examiner* — Mark L. Greene
(74) *Attorney, Agent, or Firm* — Crowell & Moring LLP

(57)    ABSTRACT

A system for operating a vehicle function of a motor vehicle includes a sensor module. The sensor module is configured to detect, at a plurality of times during an idle state of the motor vehicle, a rain condition and a brightness at the location of the motor vehicle via a sensor system. The sensor module is also configured to store information about the detected rain conditions and brightnesses. The sensor module is also configured to operate a vehicle function of the motor vehicle depending on the stored information.

8 Claims, 2 Drawing Sheets

(52) U.S. Cl.
  CPC ..... *B60H 1/00785* (2013.01); *B60W 2555/20*
    (2020.02); *B60W 2556/30* (2020.02)

(58) Field of Classification Search
  CPC ....... B60K 2028/003; B60K 2028/006; B60W
    30/18009; B60W 2555/20; B60W
    2556/30; G05D 1/0061; G05D 1/0088;
    G05D 1/021; G05D 1/0214; G05D
    1/0221; G05D 1/0223
  See application file for complete search history.

(56)           References Cited

FOREIGN PATENT DOCUMENTS

| DE | 10 2012 214 358 | A1 | 2/2014 |
| DE | 10 2014 210 935 | A1 | 12/2015 |
| DE | 10 2017 204 977 | A1 | 9/2018 |
| DE | 10 2017 207 533 | A1 | 11/2018 |
| DE | 10 2020 200 828 | A1 | 7/2021 |
| DE | 10 2020 107 068 | A1 | 9/2021 |
| DE | 10 2020 215 786 | A1 | 6/2022 |
| DE | 10 2021 200 127 | A1 | 7/2022 |

OTHER PUBLICATIONS

Zhang, CN 113464017, machine translation. (Year: 2021).*
Kostermann, DE 10 2021 200 127, machine translation. (Year: 2022).*
International Search Report (PCT/ISA/210) issued in PCT Application No. PCT/EP2023/072093 dated Oct. 24, 2023 with English translation (6 pages).
German-language Written Opinion (PCT/ISA/237) issued in PCT Application No. PCT/EP2023/072093 dated Oct. 24, 2023 with English translation (9 pages).
German-language Search Report issued in German Application No. 10 2022 120 821.4 dated Apr. 11, 2023 with partial English translation (11 pages).

* cited by examiner

SYSTEM AND METHOD FOR OPERATING A VEHICLE FUNCTION

BACKGROUND AND SUMMARY OF THE DISCLOSURE

The disclosure relates to a system and a method for operating a vehicle function of a motor vehicle. The disclosure relates in particular to the automatic performance of a vehicle function of a motor vehicle depending on environmental data detected during an idle state of the motor vehicle by means of a sensor system.

Most modern vehicles are equipped with numerous sensors that support the operation of various vehicle functions. During the driving operation of a motor vehicle, lighting, ventilation, air conditioning, or windscreen wiper functions, for example, can be operated depending on sensor information, which is detected by a rain-light-solar-condensation sensor (RLSBS) arranged in the region of a windshield. In addition, it is possible, for example, to obtain relevant weather information from a backend or from the Internet using a GPS position of a motor vehicle and also to take this into account when operating such vehicle functions.

There is a need to continuously improve the way in which the control of vehicle functions is matched to environmental parameters. The energy consumption of the sensor system and processing electronics involved should be as low as possible.

Proceeding from this, it is an object of the present disclosure to provide an improved system for operating a vehicle function depending on environmental data detected by sensors and to provide a corresponding method.

This and other objects are achieved by the features of the disclosure. Advantageous embodiments are also described in the disclosure.

It is pointed out that additional features of a claim that depends on an independent claim may constitute a separate invention independent of the combination of all the features of the independent claim either without the features of the independent claim or only in combination with a subset of the features of the independent claim, which invention can be made the subject of an independent claim, a divisional application, or a subsequent application. This also applies to technical teachings described in the description, which may constitute an invention that is independent of the features of the disclosure.

A first aspect of the present disclosure relates to a system for operating a vehicle function of a motor vehicle. The motor vehicle can in particular be a road-based motor vehicle, such as an electrically driven passenger vehicle.

According to the disclosure, the system is designed to operate the vehicle function depending on environmental data recorded during an idle state of the motor vehicle. In this case, the system is designed in particular to detect, at a plurality of times during the idle state of the motor vehicle, in each case a rain condition and a brightness in the environment of the motor vehicle by means of a sensor system, to store information about the detected rain conditions and brightnesses, and to operate the vehicle function of the motor vehicle depending on the stored information.

In this context, the idle state of the motor vehicle is to be understood as a state which is comparatively energy-saving compared to the state in which the motor vehicle is immediately ready to drive or is actually driving. Parked motor vehicles which do not have a running drive normally take on such an energy-saving idle state. In the idle state, basic monitoring functions or the like are generally performed, which only load the on-board power supply network to a small extent.

In particular, information about the rain condition should be understood as an indication as to whether it has rained at the time in question. The information can optionally also specify a rain intensity.

According to one exemplary embodiment, the above-mentioned sensor system is also in an energy-saving standby mode for the majority of the time during the idle state of the motor vehicle. The system is designed to wake up the sensor system from its standby mode shortly before the plurality of times at which environmental data is to be detected, in order to enable the detection of the rain condition and the brightness (as well as, if necessary, other environmental data such as temperature and/or humidity). It is preferably provided that, even during the detection of the environmental information by means of the sensor system, the motor vehicle as a whole is not woken up from its idle state and supplied with power; rather, the motor vehicle preferably also remains in the idle state during the sensor recordings at the plurality of times.

The disclosure is based on the idea that environmental information, such as weather information, is becoming increasingly important in order to correctly determine the vehicle state of a motor vehicle at start-up and to be able to adjust certain settings or to operate vehicle functions depending on such information. In systems and solutions known in the prior art, weather information is determined by means of a vehicle sensor system during the start-up and driving operation of a motor vehicle, but not in the time period between parking and restarting the motor vehicle.

It is also known to determine weather data by accessing a backend or the Internet, wherein a current location of the vehicle can be taken into account by means of GPS positioning. However, it can happen that weather data determined on the basis of such global weather data does not match the actual state of a motor vehicle, e.g., if it is housed in a protected environment such as an underground car park in a garage or under a carport. In such cases, it could be concluded, for example, from the global weather data, that the vehicle was exposed to rain during the last two days, whereas the vehicle was actually parked in the garage protected from rain during this time period.

The solution proposed here overcomes this problem by repeatedly acquiring and storing environmental data, in particular relating to the rain condition, temperature and brightness, during the vehicle idle state, and optionally over a longer period of time. When the vehicle is started, the recorded data can be sent to one or more control units for one or more vehicle functions, enabling the respective vehicle functions to be performed depending on the recorded environmental data. This allows the vehicle functions to be specifically adapted to the environmental conditions to which the vehicle was exposed during its idle state. In addition, it can be provided that, in the case of certain individual or combined environmental data, which are acquired at one or more points in time, the motor vehicle, or a functional component of the motor vehicle, is woken up from the idle state in order to activate a suitable action in response to the environmental conditions (such as a light animation, air conditioning, etc.) in a timely manner.

The proposed solution also has the advantage that it can, where necessary, do without the inclusion of a backend or the Internet and thus also without corresponding communication links. For example, a car parked in an underground car park, which currently has no access to a mobile phone connection, can locally operate the system described here or can locally carry out the method proposed here.

According to one embodiment, it is provided that a time interval in the range of 10 minutes to 200 minutes, preferably in the range of 15 minutes to 60 minutes, such as about 20 minutes or 30 minutes, is provided between the plurality of times in which the environmental data are detected. For example, a consistent time interval with such a duration can be provided between the plurality of times at which the sensor system detects the respective environmental data.

According to one development, the system is further designed to detect a temperature (in particular an ambient temperature of the motor vehicle) and/or a humidity for each of the times, in addition to the rain condition and the brightness, by means of the sensor system, to store information about the detected temperatures and/or humidity, and to also operate the vehicle function depending on the stored information about the detected temperatures and/or humidities.

According to one embodiment, the sensor system is arranged in the region of a windscreen of the motor vehicle, for example in the form of a rain-light sensor module or a rain-light-solar-condensation sensor module. In general, the sensor system can be arranged in a sensor module, which can comprise, for example, in addition to the sensors themselves, a data processing device for actuating the respective sensors and a data memory connected to the data processing device for storing the detected information.

According to one embodiment, the system is designed to send the stored information—e.g., in the form of a compact measurement data report—to a control device for controlling the vehicle function of the motor vehicle when the motor vehicle is started or otherwise woken up from its idle state. In this case, the vehicle function can be operated depending on the stored information after the end of its idle state, e.g., while driving.

However, it is also within the scope of the disclosure that the system can be designed to wake up the motor vehicle from its idle state depending on information about rain conditions and brightnesses (and possibly other environmental data such as temperatures and/or humidities) detected at one or more of the points in time and to subsequently perform the vehicle function in a timely manner. In other words, the operation of the vehicle function depending on the stored information can, according to some embodiments, also comprise waking up the vehicle from the idle state depending on the detected environmental conditions. Furthermore, it is within the scope of the disclosure that one or more vehicle functions can still be performed during the idle state of the motor vehicle depending on the stored information.

The vehicle function, which is operated depending on the stored functions, can include, for example, an interior and/or exterior lighting function of the motor vehicle. For example, the stored environmental information can be used to activate or deactivate one or more active lighting functions at night.

For example, depending on the stored information (and, optionally, further detected information, such as an approach of a driver to the motor vehicle detected by sensors), a light animation, for example in the form of a "welcome light" animation involving headlights and/or rear lights, direction indicators, interior lighting and/or a light projection on the ground near the motor vehicle, can be performed. Such an animation function requires a large amount of energy to permanently monitor whether the driver is close to the vehicle, such as within a radius of 5 m around the vehicle. In order to save power, this function should therefore only be performed during the night or in dark vehicle environments. In this case, the present disclosure enables a control device controlling the light animation to be immediately woken up in the event of a condition change between day and night detected on the basis of the brightness information, thus enabling the light animation functions to be provided.

According to a further embodiment, the vehicle function comprises at least one ventilation and/or air conditioning function. For example, when starting the motor vehicle, the vehicle interior can be ventilated or air-conditioned depending on the stored information about the environmental conditions.

It is further within the scope of the disclosure that the vehicle function can comprise a drive and/or braking function of the motor vehicle. It can be provided, for example, that the stored information is used to control an active braking action after the idle state in driving operation and thus selectively prevent corrosion of the brakes after the motor vehicle has been exposed to rain. For example, in the case of an electrically driven motor vehicle, if the stored information indicates that the motor vehicle was exposed to rain and/or moisture during its idle state to a degree or for a period of time that makes corrosion of parts of the braking system probable, braking by means of recuperation (i.e., by energy recovery by the electric drive unit) can be selectively applied to a somewhat lesser extent and instead applied somewhat more actively by means of a conventional braking system. For example, additionally stored temperature information can also be input into this decision.

In this context, it is advantageous in the inventive solution that information about rain and moisture can therefore not only be obtained by means of a GPS location of the vehicle in combination with weather data from the Internet or a backend. Rather, in particular, the stored brightness and rain condition information according to the disclosure can provide added value in such a way that, on the basis of such information, it can be determined, for example, that the vehicle was parked in a protected environment, such as in an underground car park, for several days before the start of a journey. For example, it can be deduced from the stored brightness data that the vehicle was in such a protected environment, and the stored rain sensor data can directly confirm that the vehicle has not been exposed to rain during the previous days. In such a case, even though it has rained for a long period time according to global weather data, it may not be appropriate to shift the focus of the driving operation from recuperation to active braking by means of the braking system, as there is no risk of corrosion of the brakes after the vehicle has been in the garage.

According to a second aspect of the disclosure, a method for operating a vehicle function of a motor vehicle is specified. The method comprises the steps: detecting, at a plurality of times during an idle state of the motor vehicle, a respective rain condition and a respective brightness in the environment of the motor vehicle; storing information about the detected rain conditions and brightnesses; and operating a vehicle function of the motor vehicle depending on the stored information.

The method according to the second aspect of the disclosure can be carried out in particular by means of a system according to the first aspect of the disclosure. For example, the system can have a data processing device which is programmed to automatically perform some or all of the above-mentioned method steps. Such a data processing device can comprise one or more processors, for example, on which the necessary computing operations for executing such a computer program run. The data processing device or the system can further comprise a data memory for recording the information about the detected environmental conditions.

The comments above and below relating to the system according to the first aspect of the disclosure can also refer analogously to the method according to the second aspect of the disclosure. Advantageous exemplary embodiments of the method according to the disclosure that are not explicitly described in this section or in the claims correspond to the advantageous embodiments of the system according to the disclosure described in the description or in the claims and vice versa.

The disclosure will now be described in greater detail based on exemplary embodiments and by reference to the attached drawings. The features and feature combinations cited in the description and/or shown in the drawings alone are applicable not only in the respective combination indicated but also in other combinations or in isolation, without departing from the scope of the disclosure.

DETAILED DESCRIPTION OF THE DRAWINGS

Figure 1A:
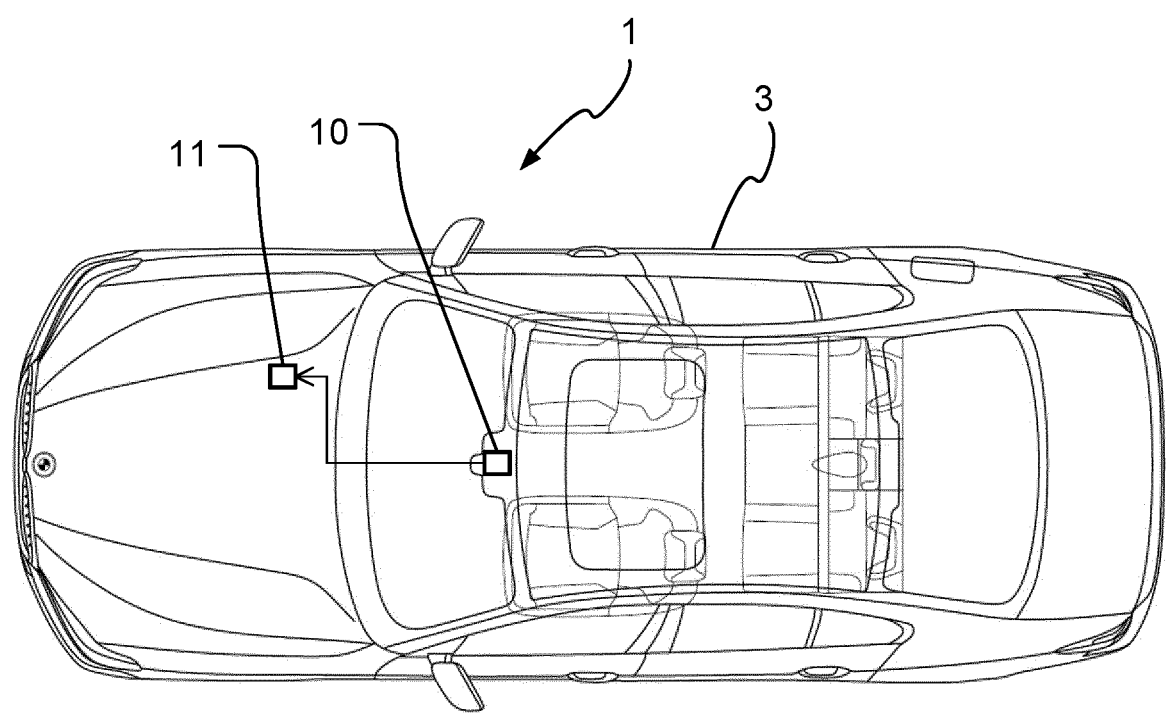
FIG. 1A shows a schematic and exemplary drawing of a motor vehicle having a system for operating a vehicle function of a motor vehicle depending on environmental information detected during an idle state of the motor vehicle.

FIG. 1A shows a plan view of a motor vehicle 3, which is equipped with a system 1 for operating a vehicle function depending on environmental information detected during an idle state of the motor vehicle 3.

The system 1 comprises a sensor module 10 in the form of a rain-light-solar-condensation sensor (RLSBS) arranged in an upper, central region of a windshield (in the area of a rear-view mirror) of the motor vehicle 3. The sensor module 10 is connected in terms of data transmission to a control device 11 of a vehicle function and is designed to transmit stored environmental data to the control device 11.

Figure 1B:
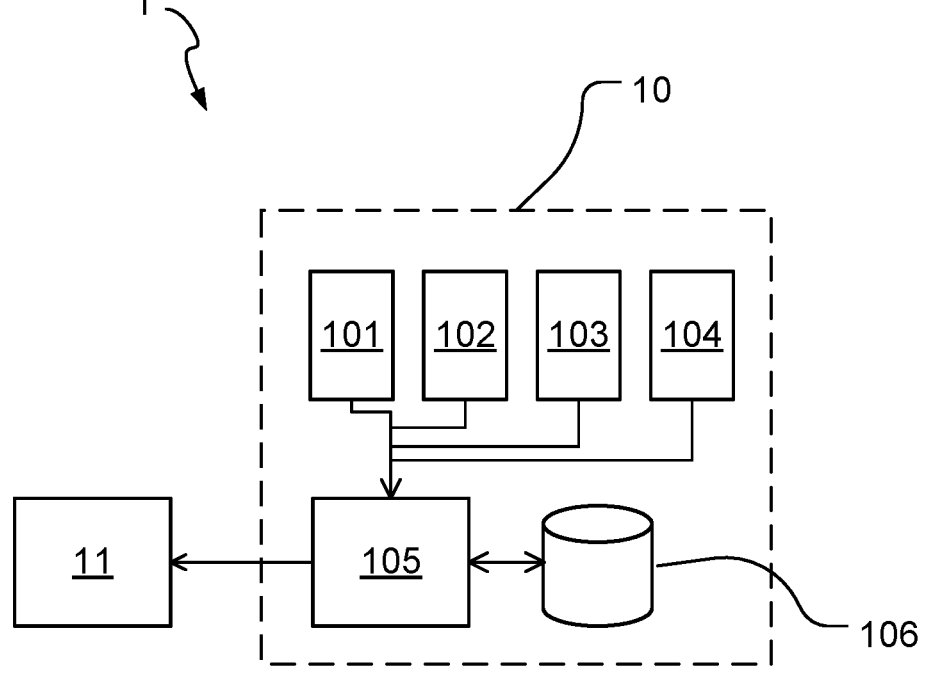
FIG. 1B shows a schematic and exemplary drawing of details of the system of FIG. 1A.

FIG. 1B shows a schematic view of the system 1 of FIG. 1A and in particular of the sensor module 10 in greater detail.

The sensor module 10 comprises a sensor system having a rain sensor 101, a light sensor 102, a solar sensor 103 and a condensation sensor 104. Such sensors 101, 102, 103, 104 as part of an RLSBS are known to a person skilled in the art. For example, the rain sensor 101 can be an optoelectronic sensor, which detects whether it is raining by means of a reflection behavior which is changed by raindrops. This information can be used, for example, to control a windscreen wiper system. The light sensor 102 can comprise one or more photodiodes for detecting an ambient brightness. This information can be used, for example, to automatically switch a headlight on and off. The solar sensor 103 can be designed to detect an intensity of sunlight for the driver and passenger sides via a respective photodiode. This information can be used, for example, to adjust the air conditioning system to suit the situation. The condensation sensor 104 uses a capacitive sensor to detect humidity in the region of the windscreen and a temperature on the inside of the windscreen. A dew point can be calculated from these measured values. Using the information about the dew point, window misting can be prevented or removed at an early stage by making a suitable adjustment or activation of a ventilation and/or air conditioning system.

The control unit 11 is shown in FIGS. 1A-B as an example of one or more control units for controlling a wide range of vehicle functions. For example, by means of a respective control unit 11, an interior and/or exterior lighting function, a light animation, a ventilation and/or air conditioning function or (in particular in the case of an electrically driven motor vehicle 3) a drive and/or braking function can be operated depending on the stored information.

The system 1 is designed to detect at least one rain condition and a brightness in the environment of the motor vehicle 3 at a plurality of times during an idle state of the motor vehicle 3. For this purpose, the data processing device 105 of the sensor module 10 can wake up the rain sensor 101 and the light sensor 102 (and optionally additionally the solar sensor 103) from an energy-saving standby mode at regular time intervals, such as every 20 or 30 minutes, and store the respective rain condition and the respective brightness in the data memory 106. In addition to the brightness and the rain condition, additional environmental data, such as a temperature and/or humidity detected by means of the condensation sensor 104, can be acquired and stored at each of the plurality of times.

Between the plurality of times, for example, a time interval can be provided in the range of 10 minutes to 200 minutes, preferably in the range of 15 minutes to 60 minutes. For example, a consistent time interval for the detection is conceivable, such as every 20 minutes or every 30 minutes. The time interval can be configurable as needed to provide different degrees of granularity of the recording of the environmental data to the needs of the functional application.

As already mentioned, the data processing device 105 can be designed to send the stored information to the control device 11 when the motor vehicle is woken up from its idle state, or is started, for example. The stored information can be sent, for example, in the form of a report, which comprises a compact summary of the recorded measured values together with the assigned time points. For example, after the motor vehicle 3 has had several days of downtime, such a report can provide information at 250 times indicating when and how often the vehicle was exposed to rain at its location, when and how often it was bright or dark in the environment of the motor vehicle 3, what temperatures were prevailing at different times, and whether it was humid in the vehicle interior at different times.

Such environmental information detected over a longer period of time, such as for example over a few days, can be used profitably, for example, to determine whether corrosion of parts of motor vehicle 3 is to be expected due to the environmental conditions to which the motor vehicle 3 is exposed during its idle state. This can particularly affect the brakes of the motor vehicle 3. Depending on the stored information, a braking function can be selectively controlled which eliminates corrosion. In particular, in the case of an electrically driven vehicle, more or less active braking (in contrast to recuperation by means of the electric drive machine) can be selectively applied in order to counteract a possible collision.

In an exemplary scenario, information about temperature brightness, humidity and/or condensation recorded over several days can be used to determine relatively reliably that the vehicle was most likely kept in a garage. It is therefore not expected that the motor vehicle 3 was exposed to conditions that promote moisture-related corrosion of the brakes. A countermeasure in the form of a targeted increase in the proportion of active braking (as opposed to recupera- tion) is not necessary in this case, and the drive and/or braking functions of the motor vehicle 3 can accordingly be operated normally, e.g., with the focus on electrical recu- peration. It should be noted that long-term data detection can be advantageous, especially in the case of the described corrosion problem, since such effects can still occur, for example, several days after the motor vehicle 3 was last exposed to a humid environment.

The data processing device 105 of the sensor module 10 can also be designed so that motor vehicle 3 can wake up from its idle state depending on information about rain conditions and brightnesses (and, if necessary, other envi- ronmental data such as temperature and humidity) detected at one or more points in time, in order to be able to perform a vehicle function in response to these environmental con- ditions in a timely manner. This can, for example, affect the timely activation of a light animation function when the vehicle environment changes from day to night or from bright to dark conditions. In this case, the activation of the light animation means the shifting of the light animation system into a state in which it monitors the vehicle envi- ronment for a possible approach of a driver to the motor vehicle 3 in order to then perform a welcome animation.

Because according to the disclosure the sensor system 101, 102, 103, 104 is not permanently active during the idle state of the motor vehicle 3, but only briefly wakes up at a plurality of times from an energy-saving standby mode in order to detect the respective measurement values, an energy-efficient monitoring and documentation of the envi- ronmental conditions is also possible over longer periods, such as several days.

Figure 2:
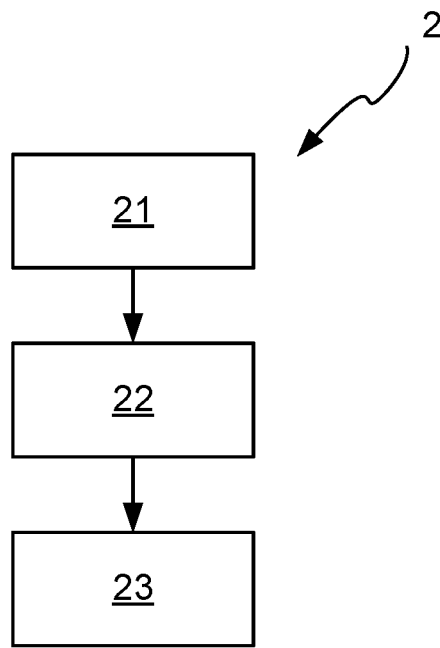
FIG. 2 shows a schematic flowchart of a method for operating a vehicle function of a motor vehicle depending on environmental information detected during an idle state of the motor vehicle.

FIG. 2 schematically shows a flowchart of a method 2 for operating a driving function of a motor vehicle 3 depending on environmental information detected during an idle state of the motor vehicle 3. The method of the above described mode of operation corresponds to the system 1 of FIGS. 1A-B. In other words, the method 2 can be carried out by means of the system 1 or the system 1 can be designed to carry out the method 2.

In accordance with this, the method comprises in particu- lar the following steps 21, 22, 23: detecting 21, at a plurality of times during an idle state of the motor vehicle 3, a respective rain condition and a respective brightness in an environment of the motor vehicle 3 by means of a sensor system 101, 102, 103, 104; storing 22 information about the detected rain conditions and brightnesses; and operating 23 a vehicle function of the motor vehicle 3 depending on the stored information.

Further details and possible embodiments of this method 2 correspond to the explanations described above for the system 1.

The invention claimed is:

1. A system for operating a vehicle function of a motor vehicle, comprising:
   a sensor module that is configured to:
       detect, at a plurality of times during an idle state of the motor vehicle, a rain condition and a brightness at the location of the motor vehicle via a sensor system;
       store information about the detected rain conditions and brightnesses; and operate a vehicle function of the motor vehicle depend- ing on the stored information, wherein the sensor module is also configured to wake up the sensor system from an energy-saving standby mode before each of the plurality of times in order to enable detection of the rain condition and the brightness.

2. The system as claimed in claim 1, wherein the sensor module is also configured to:
   detect a temperature for each of the plurality of times, in addition to the rain condition and the brightness, via the sensor system;
   store information about the detected temperatures; and
   operate the vehicle function depending on the stored information about the detected temperature.

3. The system as claimed in claim 1, wherein the sensor module is also configured to:
   detect a humidity for each of the plurality of times, in addition to the rain condition and the brightness, via the sensor system;
   store information about the detected humidities; and
   operate the vehicle function depending on the stored information about the detected humidities.

4. The system as claimed in claim 1, wherein a time interval in a range of 10 minutes to 200 minutes is provided between the plurality of times.

5. The system as claimed in claim 1, wherein the vehicle function comprises one or more of:
   an interior and/or exterior lighting function of the motor vehicle;
   a light animation;
   a ventilation and/or air conditioning function; and
   a drive and/or braking function.

6. The system as claimed in claim 1, wherein the sensor module is also configured to wake up the motor vehicle from the idle state, depending on information about the rain conditions and the brightnesses detected at one or more of the plurality of times.

7. A system for operating a vehicle function of a motor vehicle, comprising:
   a sensor module that is configured to:
       detect, at a plurality of times during an idle state of the motor vehicle, a rain condition and a brightness at the location of the motor vehicle via a sensor system;
       store information about the detected rain conditions and brightnesses; and
   operate a vehicle function of the motor vehicle depending on the stored information, wherein the sensor module is also configured to send the stored information to a control device configured to control the vehicle func- tion when the motor vehicle is woken up from the idle state.

8. A system for operating a vehicle function of a motor vehicle, comprising:
   a sensor module that is configured to:
       detect, at a plurality of times during an idle state of the motor vehicle, a rain condition and a brightness at the location of the motor vehicle via a sensor system;
       store information about the detected rain conditions and brightnesses; and
   operate a vehicle function of the motor vehicle depending on the stored information, wherein the sensor system is arranged in a region of a windshield of the motor vehicle.

* * * * *